United States Patent
Pess et al.

(10) Patent No.: US 11,498,691 B2
(45) Date of Patent: Nov. 15, 2022

(54) REDUNDANT SYSTEMS FOR VEHICLE CRITICAL SYSTEMS

(71) Applicant: Hamilton Sundstrand Corporation, Charlotte, NC (US)

(72) Inventors: Matthew Pess, West Hartford, CT (US); Jonathan Rheaume, West Hartford, CT (US); John S. Murphy, Wilbraham, MA (US); Peter AT Cocks, South Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 362 days.

(21) Appl. No.: 16/374,937

(22) Filed: Apr. 4, 2019

(65) Prior Publication Data

US 2020/0317361 A1 Oct. 8, 2020

(51) Int. Cl.
*B64D 37/32* (2006.01)
*B01D 53/32* (2006.01)
(Continued)

(52) U.S. Cl.
CPC ............... *B64D 37/32* (2013.01); *A62C 3/07* (2013.01); *A62C 3/08* (2013.01); *B01D 53/326* (2013.01);
(Continued)

(58) Field of Classification Search
CPC ............. B64D 37/32; B64D 2045/009; B64D 2013/0677; B01D 2256/10;
(Continued)

(56) References Cited

U.S. PATENT DOCUMENTS 7,208,239 B2 4/2007 Hoffjann et al.
7,968,237 B2 6/2011 Grieve et al.
(Continued)

FOREIGN PATENT DOCUMENTS

DE 102013100348 A1 * 7/2014 ......... H01M 8/0662
DE 102013100348 A1 7/2014
(Continued)

OTHER PUBLICATIONS

European Search Report for European Application No. 19212097.0, International Filing Date Nov. 28, 2019, dated Jun. 26, 2020, 7 pages.

*Primary Examiner* — Salil Jain
(74) *Attorney, Agent, or Firm* — Cantor Colburn LLP

(57) ABSTRACT

Redundant electrochemical systems and methods for vehicles are described. The systems include a first electrochemical device located at a first position on the vehicle wherein the first electrochemical device is configured to generate at least one of inert gas, oxygen, and electrical power and a second electrochemical device located at a second position on the vehicle wherein the second electrochemical device is configured to generate at least one of inert gas, oxygen, and electrical power. The first electrochemical device is configured to operate in a first mode during normal operation of the vehicle and a second mode when the second electrochemical device fails, wherein in the second mode, the first electrochemical device provides the at least one of inert gas, oxygen, and electrical power for at least one vehicle critical system of the vehicle.

20 Claims, 7 Drawing Sheets

(51) Int. Cl.
*A62C 3/08* (2006.01)
*A62C 3/07* (2006.01)
*F23L 7/00* (2006.01)

(52) U.S. Cl.
CPC .............. *F23L 7/00* (2013.01); *B01D 2256/10* (2013.01); *B01D 2259/4575* (2013.01); *C01B 2210/0045* (2013.01); *F23L 2900/07002* (2013.01)

(58) Field of Classification Search
CPC .............. B01D 2256/12; B01D 53/326; B01D 2259/4575; B01D 2259/4566; B01D 2257/104; B62D 5/30; B64G 1/402; F02M 21/0293; F02M 21/0221; B63B 43/00; B63B 17/002; F02B 77/08; B60P 1/4478; A62C 3/07; A62C 3/08; A62C 3/10; A62C 99/0018; A62C 99/0027; F23L 7/00; F23L 2900/07002
See application file for complete search history.

(56) References Cited

U.S. PATENT DOCUMENTS

| | | |
|---|---|---|
| 8,813,860 B2 | 8/2014 | Bleil et al. |
| 2013/0099560 A1* | 4/2013 | Shipley .................... H02J 3/38 |
| | | 307/9.1 |
| 2014/0087283 A1 | 3/2014 | Stolte et al. |
| 2016/0090189 A1 | 3/2016 | Wangemann et al. |
| 2017/0170494 A1 | 6/2017 | Lents et al. |
| 2017/0341019 A1* | 11/2017 | Rheaume ............... B01D 69/08 |

FOREIGN PATENT DOCUMENTS

| | | | | |
|---|---|---|---|---|
| EP | 2712013 A1 * | 3/2014 | ........ | H01M 8/04303 |
| EP | 2712013 A1 | 3/2014 | | |
| WO | 2007054316 A1 | 5/2007 | | |
| WO | WO-2007054316 A1 * | 5/2007 | ............. | A62C 99/00 |

* cited by examiner

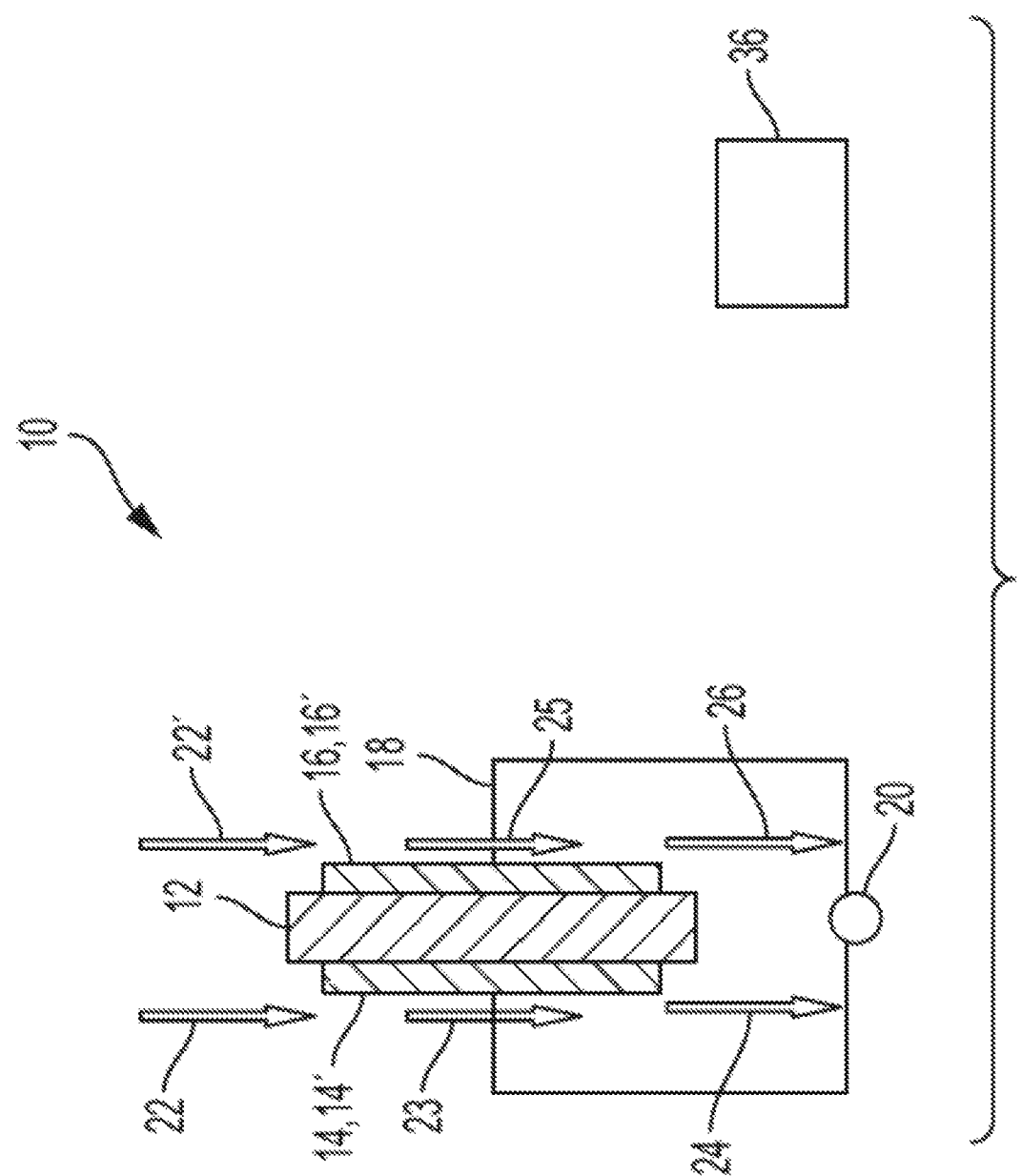

REDUNDANT SYSTEMS FOR VEHICLE CRITICAL SYSTEMS

BACKGROUND

The subject matter disclosed herein generally relates to systems for generating and providing inert gas, oxygen, and/or power on vehicles (e.g., aircraft, military vehicles, heavy machinery vehicles, sea craft, ships, submarines, etc.), and, more particularly, to redundant systems for vehicle critical systems.

It is recognized that fuel vapors within fuel tanks become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, etc.) with onboard inerting gas generating systems, which supply nitrogen-enriched air to the vapor space (i.e., ullage) within the fuel tank. The nitrogen-enriched air has a substantially reduced oxygen content that reduces or eliminates oxidizing conditions within the fuel tank. Onboard inerting gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air.

One type of membrane-based electrochemical gas separator is a Proton Exchange Membrane (PEM). In one mode of operation, the PEM is an electrolytic gas generator that requires deionized (DI) water, electric power, and air to produce streams of inert gas and oxygen. In another mode of operation, the PEM is operated as a fuel cell that requires hydrogen and oxygen to generate electric power and inert gas. Another type of electrochemical gas separator utilizes a Solid Oxide (SO) electrolyte. In one mode of operation, the SO device is an electrolytic gas generator that requires electric power and air to produce streams of inert gas and oxygen. In another mode of operation, the SO device is operated as a fuel cell that requires fuel, such as hydrogen and carbon monoxide, as well as oxygen to generate power and inert gas.

BRIEF DESCRIPTION

According to some embodiments, redundant electrochemical systems for vehicles are provided. The systems include a first electrochemical device located at a first position on the vehicle wherein the first electrochemical device is configured to generate at least one of inert gas, oxygen, and electrical power and a second electrochemical device located at a second position on the vehicle wherein the second electrochemical device is configured to generate at least one of inert gas, oxygen, and electrical power. The first electrochemical device is configured to operate in a first mode during normal operation of the vehicle and a second mode when the second electrochemical device fails, wherein in the second mode, the first electrochemical device provides the at least one of inert gas, oxygen, and electrical power for at least one vehicle critical system of the vehicle.

In addition to one or more of the features described herein, or as an alternative, further embodiments of the systems may include that the second electrochemical device is configured to operate in a first mode during normal flight and a second mode when the first electrochemical device fails, wherein in the second mode of the second electrochemical device, the second electrochemical device provides the at least one of inert gas, oxygen, and electrical power for at least one vehicle critical system of the vehicle.

In addition to one or more of the features described herein, or as an alternative, further embodiments of the systems may include at least one additional electrochemical device, wherein the at least one additional electrochemical device is configured to operate in a first mode during normal flight and a second mode when at least one of the first electrochemical device and the second electrochemical device fails, wherein in the second mode, the at least one additional electrochemical device provides the at least one of inert gas, oxygen, and electrical power for at least vehicle critical system of the vehicle.

In addition to one or more of the features described herein, or as an alternative, further embodiments of the systems may include that at least one of the first electrochemical device and the second electrochemical device is a PEM inerting system. The PEM inerting system includes an electrochemical cell comprising a cathode and an anode separated by a separator comprising an ion transfer medium, a cathode fluid flow path in operative fluid communication with a catalyst at the cathode between a cathode fluid flow path inlet and a cathode fluid flow path outlet, a cathode supply fluid flow path between a cathode supply gas source and the cathode fluid flow path inlet, an anode fluid flow path in operative fluid communication with a catalyst at the anode, including an anode fluid flow path outlet, an electrical connection to a power source or power sink, and an inerting gas flow path in operative fluid communication with the cathode flow path outlet and the cathode supply gas source.

In addition to one or more of the features described herein, or as an alternative, further embodiments of the systems may include that the first location and the second location are substantially the same location.

In addition to one or more of the features described herein, or as an alternative, further embodiments of the systems may include that the first location is within or proximate a cargo hold of the vehicle.

In addition to one or more of the features described herein, or as an alternative, further embodiments of the systems may include that the first location and the second location are different.

In addition to one or more of the features described herein, or as an alternative, further embodiments of the systems may include that the first location is within or proximate a cargo hold of the vehicle and the second location is within or on a wing of the vehicle.

In addition to one or more of the features described herein, or as an alternative, further embodiments of the systems may include that the at least one vehicle critical system comprises a fuel tank inerting system, a fire suppression system, a life support system, and/or an emergency electrical power system.

In addition to one or more of the features described herein, or as an alternative, further embodiments of the systems may include that the first and the second electrochemical devices are each fluidly connected to a common inert gas distribution manifold to supply inert gas to fuel tank ullages of one or more fuel tanks of the vehicle.

In addition to one or more of the features described herein, or as an alternative, further embodiments of the systems may include a valve located within the common inert gas distribution manifold to control a fluid connection between the first electrochemical device and a fire suppression, wherein the valve is closed in the first mode and open in the second mode.

In addition to one or more of the features described herein, or as an alternative, further embodiments of the systems may include that the first and the second electrochemical devices are each fluidly connected to a common $O_2$ distribution manifold to supply oxygen to a life support system of the vehicle.

In addition to one or more of the features described herein, or as an alternative, further embodiments of the systems may include that the first and the second electrochemical devices are each electrically connected to an electrical bus to supply electrical power to one or more electrical components of the vehicle.

In addition to one or more of the features described herein, or as an alternative, further embodiments of the systems may include that each of the first and second electrochemical devices is fluidly connected to a fire suppression of the vehicle. The system further includes a valve arranged to control the fluid connection between the first electrochemical device and the fire suppression, wherein the valve is closed in the first mode and open in the second mode.

In addition to one or more of the features described herein, or as an alternative, further embodiments of the systems may include that at least one of the first electrochemical device and the second electrochemical device is a solid oxide (SO) electrochemical gas separator.

In addition to one or more of the features described herein, or as an alternative, further embodiments of the systems may include that the vehicle is an aircraft.

According to some embodiments, methods of generating at least one of inerting gas, oxygen, and electrical power on a vehicle are provided. A first electrochemical device is located at a first position on the vehicle wherein the first electrochemical device is configured to generate at least one of inert gas, oxygen, and electrical power and a second electrochemical device is located at a second position on the vehicle wherein the second electrochemical device is configured to generate at least one of inert gas, oxygen, and electrical power. The methods include operating the first electrochemical device in a first mode to generate the at least one of inert gas, oxygen, and electrical power, operating the second electrochemical device in a first mode to generate the at least one of inert gas, oxygen, and electrical power, and operating the first electrochemical device in a second mode, when the second electrochemical device fails, wherein in the second mode, the first electrochemical device generates the at least one of inert gas, oxygen, and electrical power for at least one of vehicle critical system of the vehicle.

In addition to one or more of the features described herein, or as an alternative, further embodiments of the methods may include that the vehicle is an aircraft.

In addition to one or more of the features described herein, or as an alternative, further embodiments of the methods may include that the at least one vehicle critical system comprises a fuel tank inerting system, a fire suppression system, a life support system, and/or an emergency electrical power system.

In addition to one or more of the features described herein, or as an alternative, further embodiments of the methods may include that the first electrochemical device is one of a proton exchange membrane and a solid oxide electrolyte electrochemical device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings in which like elements are numbered alike:

FIG. 2 is a schematic depiction an example embodiment of an electrochemical cell;

DETAILED DESCRIPTION

A detailed description of one or more embodiments of the disclosed apparatuses and methods are presented herein by way of illustration and exemplification and without limitation with reference to the Figures.

Figure 1A:
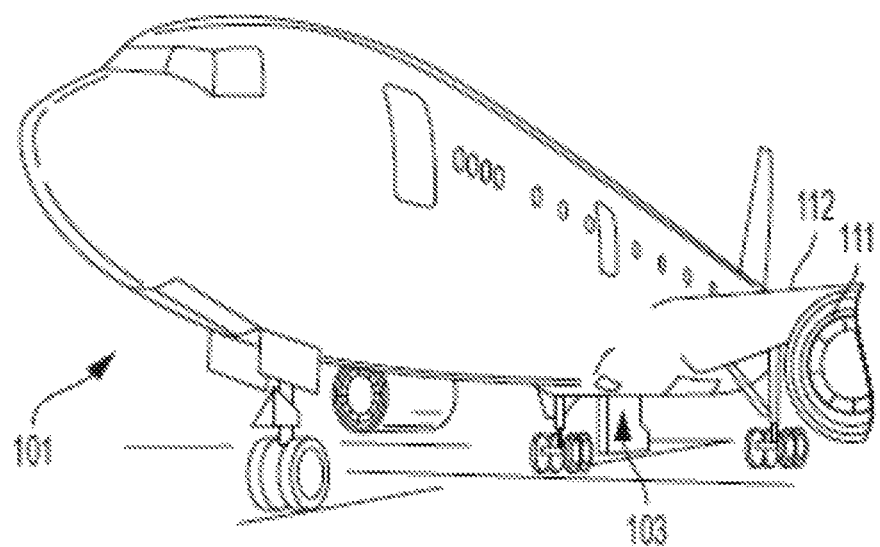
FIG. 1A is a schematic illustration of an aircraft that can incorporate various embodiments of the present disclosure.
Figure 1B:
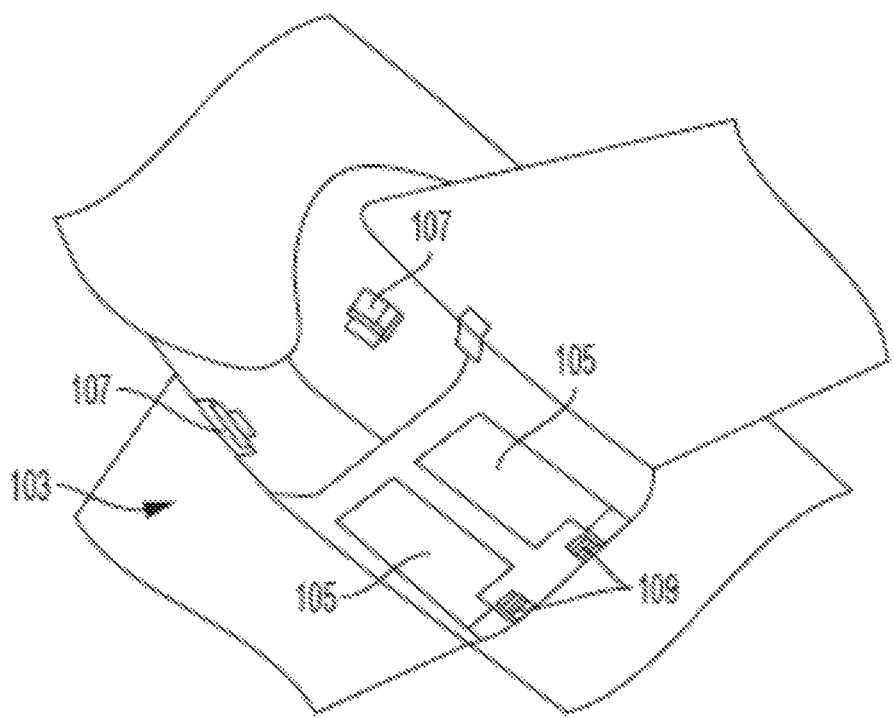
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 1B, the bay 103 includes bay doors 105 that enable installation and access to one or more components (e.g., environmental control systems, fuel inerting systems, etc.) installed within or on the aircraft. During operation of environmental control systems and/or fuel inerting systems of the aircraft, air that is external to the aircraft can flow into one or more ram air inlets 107. The outside air (i.e., ram air) may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings. The engines and/or fuel tanks may be located at other locations depending on the specific aircraft configuration. In some aircraft configurations, air can be bled from the engines 111 and supplied to environmental control systems and/or fuel inerting systems, as will be appreciated by those of skill in the art.

Although shown and described above and below with respect to an aircraft, embodiments of the present disclosure are applicable to any type of vehicle. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may electrochemical systems as described herein may include the redundant systems described herein. As such, the present disclosure is not limited to application to aircraft, but rather aircraft are illustrated and described as example and explanatory embodiments for implementation of embodiments of the present disclosure.

Referring now to FIG. 2, an electrochemical cell 10 is schematically depicted. The electrochemical cell 10 comprises a separator 12 that includes an ion transfer medium. As shown in FIG. 2, the separator 12 has a cathode 14 disposed on one side and an anode 16 disposed on the other side. The cathode 14 and the anode 16 can be fabricated from catalytic materials suitable for performing a desired electrochemical reaction (e.g., an oxygen-reduction reaction at the cathode and an oxidation reaction at the anode)—i.e., a catalytic reactor inert gas generation system. Catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Some organic materials and metal oxides can also be used as catalysts, as contrasted to electrochemical cells utilizing proton exchange membranes where the conditions preclude the use of metal oxide catalysts. Examples of metal oxide catalysts include, but are not limited to ruthenium oxides, iridium oxides or transition-metal oxides, generically depicted as $M_xO_y$, where x and y are positive numbers capable of forming a stable catalytic metal oxide such as $Co_3O_4$.

The cathode 14 and the anode 16, each including a respective catalyst 14',16', are positioned adjacent to, and preferably in contact with, the separator 12 and can be porous metal layers deposited (e.g., by vapor deposition) onto the separator 12. In other embodiments, the cathode 14 and the anode 16 can each have structures comprising discrete catalytic particles adsorbed onto a porous substrate that is attached to the separator 12. Alternatively, catalyst particles can be deposited on high surface area powder materials (e.g., graphite, porous carbons, metal-oxide particles, etc.) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, layers of the cathode 14 and layers of the anode 16 may include a binder material, such as a polymer, especially one that also acts as an ionic conductor such as anion-conducting ionomers. In some embodiments, the layers of the cathode 14 and layers of the anode 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and the anode 16 can be controllably and/or electrically connected by an electrical circuit 18 to a controllable electric power system 20. The electric power system can include a power source, such as DC power rectified from AC power produced by a generator powered by a gas turbine engine used for propulsion or by an auxiliary power unit or an aircraft. In some embodiments, the electric power system 20 can optionally include a connection to an electric power sink (e.g., one or more electricity-consuming systems or components onboard the aircraft) with appropriate switching, power conditioning, and/or power bus(es) for such on-board electricity-consuming systems or components, for optional operation in an alternative fuel cell mode. Inerting gas systems with electrochemical cells that can alternatively operate to produce nitrogen-enriched air in a fuel-consuming power production (e.g., fuel cell) mode or a power consumption mode (e.g., electrolytic cell) are disclosed in U.S. Patent Application Publication No. 2017/0331131 A1, the disclosure of which is incorporated herein by reference in its entirety.

With continued reference to FIG. 2, a cathode supply fluid flow path 22 directs gas from a fuel tank ullage space (not shown) into contact with the cathode 14. Oxygen is electrochemically depleted from air along a cathode fluid flow path 23, and is discharged as nitrogen-enriched air (NEA) (i.e., oxygen-depleted air, ODP) to an inerting gas flow path 24 for delivery to an on-board fuel tank (not shown), or to a vehicle fire suppression system associated with an enclosed space (not shown), or controllably to either or both of a vehicle fuel tank or an on-board fire suppression system.

An anode fluid flow path 25 is configured to controllably receive an anode supply fluid from an anode supply fluid flow path 22'. The anode fluid flow path 25 can include water if the electrochemical cell is configured for proton transfer across the separator 12 (e.g., a proton exchange membrane (PEM) electrolyte or phosphoric acid electrolyte). If the electrochemical cell is configured for oxygen anion transfer across the separator 12 (e.g., a solid oxide electrolyte), it can optionally be configured to receive air along the anode fluid flow path 25. Although not stoichiometrically required by the electrochemical reactions of the solid oxide electrochemical cell, airflow to the anode during power-consumption mode can have the technical effects of diluting the potentially hazardous pure heated oxygen at the anode, and providing thermal regulation to the cell. If the system is configured for alternative operation in a fuel cell mode, the anode fluid flow path 25 can be configured to controllably also receive fuel (e.g., hydrogen for a proton-transfer cell, hydrogen or hydrocarbon reformate for a solid oxide cell). An anode exhaust 26 can, depending on the type of cell and the content of the anode exhaust 26, be exhausted or subjected to further processing. Control of fluid flow along these flow paths can be provided through conduits and valves (not shown), which can be controlled by a controller 36.

In some embodiments, the electrochemical cell 10 can operate utilizing the transfer of protons across the separator 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell (i.e., Proton Exchange Membrane "PEM") in the electrolytic mode, water at the anode undergoes an electrolysis reaction according to the formula:

$$H_2O \rightarrow \tfrac{1}{2}O_2 + 2H^+ + 2e \qquad (1)$$

The electrons produced by this reaction are drawn from the electrical circuit 18 powered by the electric power system 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula:

$$\tfrac{1}{2}O_2 + 2H^+ + 2e^- \rightarrow H_2O \qquad (2)$$

Removal of oxygen from the cathode flow path 23 produces nitrogen-enriched air exiting the region of the cathode 14. The oxygen evolved at the anode 16 by the reaction of formula (1) is discharged as oxygen or an oxygen-enriched air stream as the anode exhaust 26.

During operation of a proton transfer electrochemical cell in a fuel cell mode, fuel (e.g., hydrogen) at the anode undergoes an electrochemical oxidation according to the formula:

$$H_2 \rightarrow 2H^+ + 2e^- \qquad (3)$$

The electrons produced by this reaction flow through the electrical circuit 18 to provide electric power to an electric power sink (not shown). The hydrogen ions (i.e., protons) produced by this reaction migrate across the separator 12, where they react at the cathode 14 with oxygen in the cathode flow path 23 to produce water according to the formula (2). Removal of oxygen from the cathode flow path 23 produces nitrogen-enriched air exiting the region of the cathode 14, which can be supplied to a fuel tank ullage.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions described in formulae (1) and (2) are stoichiometrically balanced with respect to water so that there is no net consumption of water, in practice moisture will be removed by the inerting gas flow path 24 (either entrained or evaporated into the nitrogen-enriched air) as it exits from the region of the cathode 14. Accordingly, in some embodiments, water is circulated past or along the anode 16 along an anode fluid flow path (and optionally also past the cathode 14). Such water circulation can also provide cooling for the electrochemical cells. In some embodiments, water can be provided at the anode from humidity in air along an anode fluid flow path in fluid communication with the anode. In other embodiments, the water produced at the cathode 14 can be captured and recycled to the anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, a controller 36 can be in operative communication with the electrochemical cell 10 or associated components (e.g., aspects of the membrane gas separator, and any associated valves, pumps, compressors, conduits, or other fluid flow components, and with switches, inverters, regulators, sensors, and other electrical system components, and any other system components to selectively operate the inerting gas system). The control connections can be through wired electrical signal connections (not shown) or through wireless connections, as will be appreciated by those of skill in the art, or combinations thereof. The controller 36 may be configured to monitor and/or control operation of the electrochemical cell 10 to generate and/or supply inert gas to various locations on an aircraft.

Figure 3:
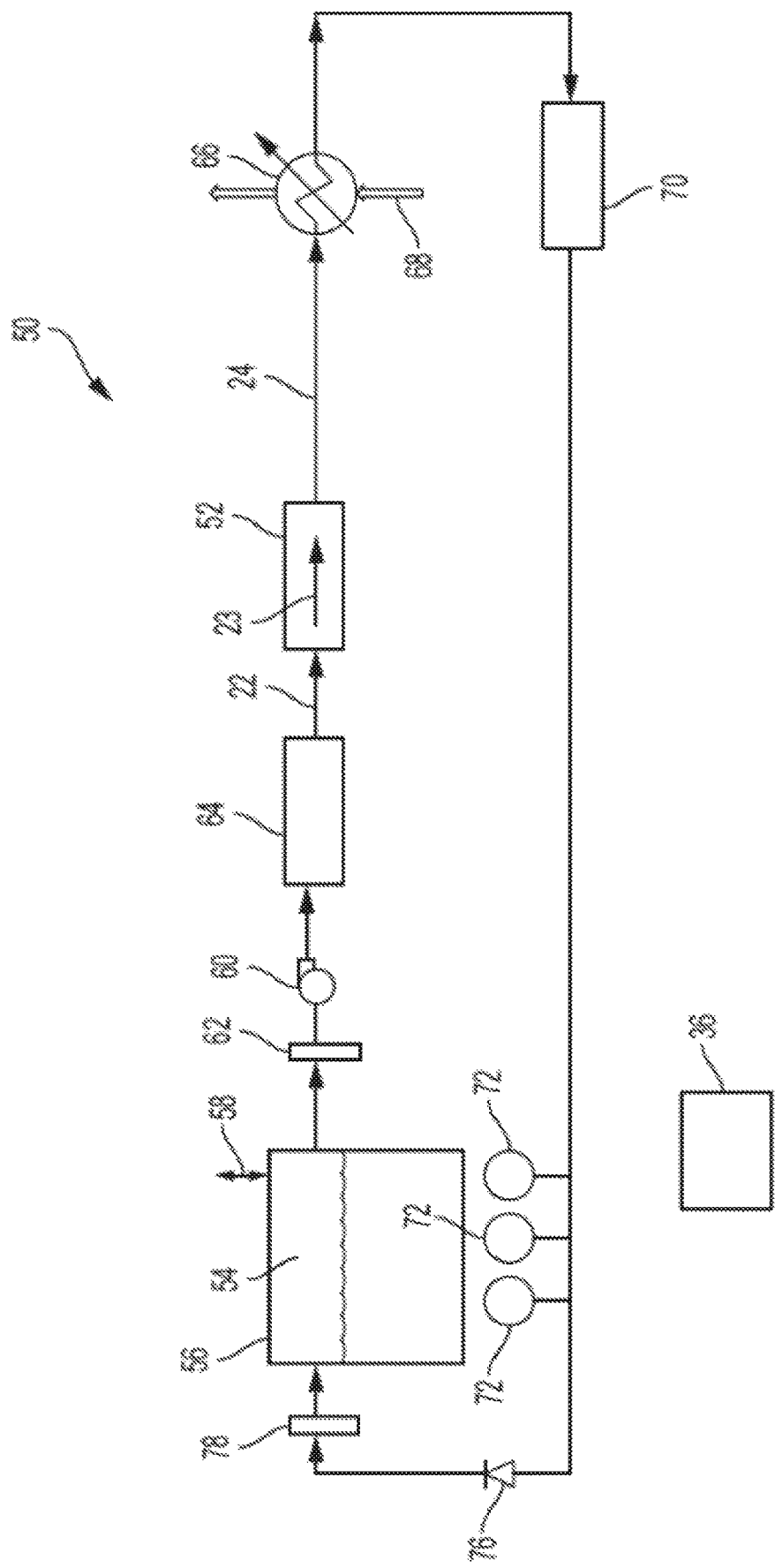
FIG. 3 is a schematic illustration of an example embodiment of an electrochemical inerting system that may incorporate embodiments of the present disclosure.

Turning now to FIG. 3, there is shown an inerting system 50 with an electrochemical cell stack 52 that receives a cathode supply feed 22 from a cathode supply gas source 54 such as a protected space, an aircraft fuel tank ullage space, an aircraft cargo hold, and an aircraft equipment bay, and is electrically connected to a power source or sink (not shown). For illustrative purposes, the cathode supply gas source 54 is shown as an ullage space in a fuel tank 56 having a vent 58. However, the cathode supply gas source could also be a cargo hold or an equipment bay, or other location on an aircraft, as will be appreciated by those of skill in the art.

Gas from the cathode supply gas source 54 is directed by a fan or blower 60 through an optional flame arrestor 62 and optional gas treatment module 64 to an internal cathode inlet header (not shown) into one or more cathode fluid flow paths 23 along the cathodes in the electrochemical cell stack 52. For ease of illustration, the anode fluid flow through an anode header of the electrochemical cell stack 52 is not shown in FIG. 3, but can be configured as described above with respect to FIG. 2 (e.g., fuel or water feed connections to an anode side of a PEM electrochemical cell for operation in fuel cell or electrolytic mode, respectively).

Various types of gas treatment modules 64 can be utilized, either integrated into a single module or as separate modules disposed in series or parallel along the cathode supply fluid flow path 22. In some embodiments, the gas treatment module 64 can be configured to remove fuel vapor from the cathode supply gas, or to remove one or more fuel contaminants from the cathode supply gas, or to remove other contaminants such as smoke such as from a fire in a cargo hold if the cathode supply gas source includes a cargo hold, or any combinations thereof. Examples of gas treatment modules include membrane separators (e.g., a reverse selective membrane with a membrane that has greater solubility with fuel vapor than air) with an optional sweep gas on the side of the membrane opposite the cathode supply fluid flow path, adsorbents (e.g., activated carbon adsorbent as a fuel vapor trap), combustors such as a catalytic oxidation reactor or other combustion reactor, etc. Examples of gas treatments that can remove contaminants include any of the above-mentioned gas treatments for removal of fuel vapor, e.g., adsorbents or catalysts for removal or deactivation of fuel contaminants such as sulfur-containing compounds that could poison catalysts in the electrochemical cell, as well as other treatments such as filters or activated carbon adsorbers.

With continued reference to FIG. 3, oxygen-depleted air is discharged from the cathode side of the electrochemical cells in the electrochemical cell stack 52 along an inerting gas flow path 24 toward one or more cathode supply gas source(s) 54. In some embodiments, a water removal module comprising one or more water removal stations can be disposed between the electrochemical cell stack 52 and the cathode supply gas source(s) 54. Examples of water removal modules include heat exchanger condensers 66 (i.e., a heat exchanger in which removal of heat condenses water vapor to liquid water, which is separated from the gas stream), membrane separators, desiccants, etc. In some embodiments or operating conditions (e.g., on-ground operation), the heat exchanger condenser 66 may not remove all of the desired amount of water to be removed. As such, supplemental drying can optionally be provided. As shown in FIG. 3, the heat exchanger condenser 66 is cooled by ram air 68 to remove water from the inerting gas and an additional dryer 70, such as a membrane separator or desiccant, is configured to remove residual water not removed by the heat exchanger condenser 66.

One or more sensors 72, such as humidity sensors, temperature sensors, and/or oxygen sensors, can be arranged to monitor the quality of the inerting gas. The sensors 72 can be used to provide information and enable control when and under what parameters the inerting gas generation system should be operated. Additional optional features may be included, without departing from the scope of the present disclosure. For example, a check valve 76 and a flame arrestor 78 can be arranged to promote safe and efficient flow of the inerting gas to the cathode supply gas source(s) 54.

Figure 4:
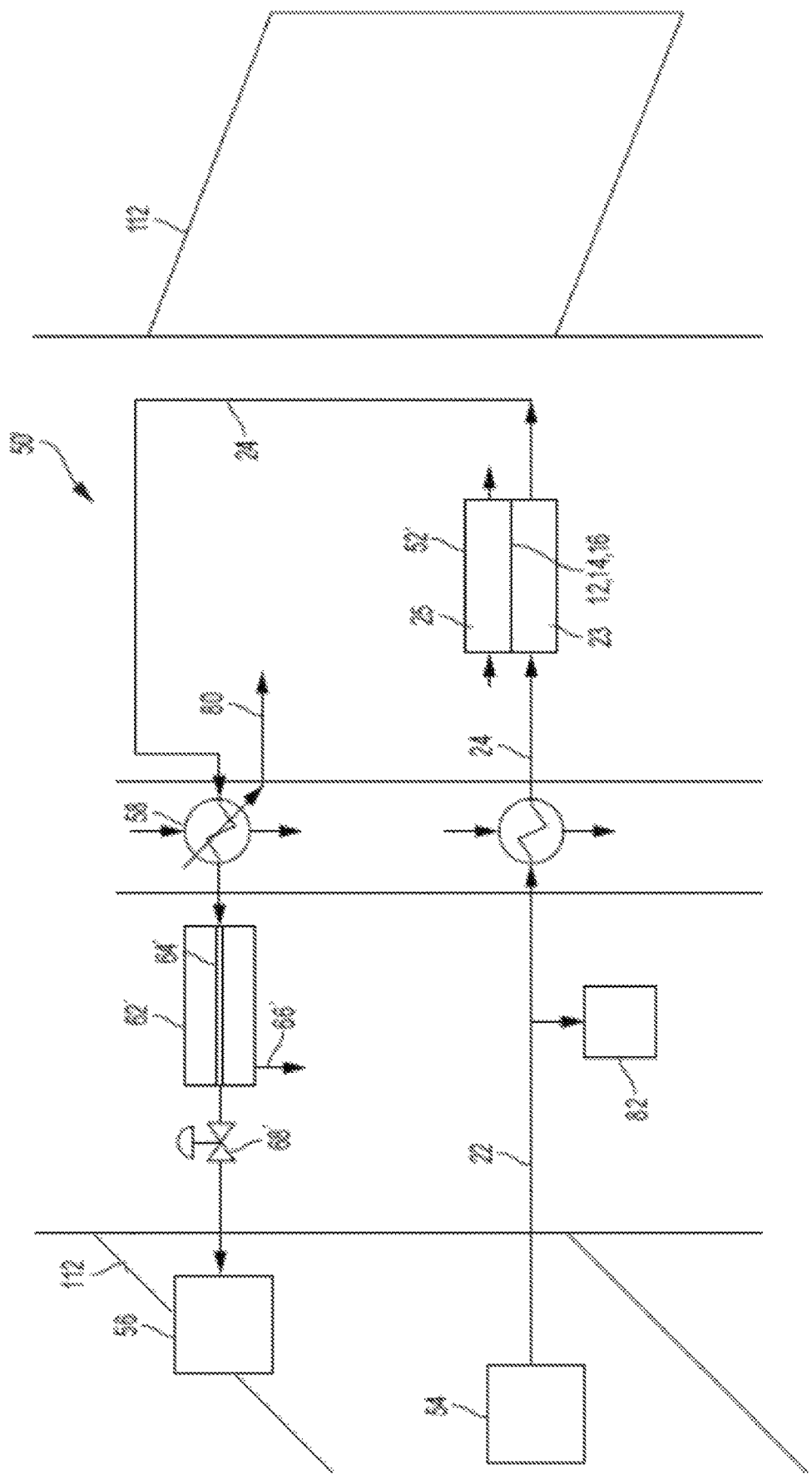
FIG. 4 is a schematic illustration of an example embodiment of an Proton Exchange Membrane (PEM) electrochemical cell inerting system that may incorporate embodiments of the present disclosure.

Turning to FIG. 4, an example embodiment of an inerting system 50' with a PEM electrochemical cell 52' onboard an aircraft is shown. As shown in FIG. 4, air from a compressed air source such as a compressor section of a turbine fan engine is directed along a cathode supply fluid flow path 22 to a PEM electrochemical cell 52'. In some embodiments, some of the compressed air can be diverted to an additional pneumatic load such as an aircraft environmental control system 82. The hot compressed air is then passed through a heat exchanger that receives cooling air from a ram air duct to cool the compressed air to a temperature suitable for the PEM electrochemical cell 52' (e.g., 50-120° C.). As illustratively labeled, the PEM electrochemical cell 52' has a similar structure, components, and labels as that described above, e.g., with respect to FIGS. 2-3.

A proton source is directed to the anode side fluid flow path 25 (e.g., hydrogen gas for operation of the cell in fuel cell (power production) mode, or water for operation of the cell in electrolytic (power consumption) mode). A condenser receives wet inerting gas from the cathode side fluid flow path 24 and cools it with ram cooling air to condense and remove water 80 from the inerting gas. The inerting gas is optionally then directed to a membrane separator 62' with a water-permeable tubular membrane 64' for removal of additional water 66' and subsequently through a pressure control device 68' to a fuel tank 56 (or other cathode supply gas source such as a cargo hold or equipment bay).

As discussed above, a PEM (Proton Exchange Membrane) On Board Inert Gas Generator (OBIGGS) is an electrochemical stack that consumes water, air, and electricity to generate an inert gas stream that can be used for Fuel Tank Inerting and/or Cargo Hold Fire Suppression as described in U.S. Pat. Nos. 9,623,981 and 9,963,792, the contents of which are each incorporated herein in their entireties. The PEM OBIGGS does not require bleed air (e.g., in contrast to conventional Air Separation Modules (ASM) which rely on an air pressure gradient across membranes for separation). In contrast, the PEM OBIGGS electrochemically depletes oxygen from air. In brief, the PEM device electrolyzes water at the anode to generate $O_2$, liberates electrons, and transports protons through a polymer electrolyte. At the cathode, the protons combine with $O_2$ in air to form water vapor. The depletion of $O_2$ thus generates an inert gas consisting of humid nitrogen and any residual oxygen. The amount of oxygen in the inert gas can be tailored to the application (e.g., <12% by volume for fuel tank passivation, <15% for bio-compatible cargo hold fire suppression, etc.).

Another system may be a solid oxide (SO) electrochemical gas separator (SOEGS) cell configured to transport oxygen out of incoming process air, resulting in inert oxygen-depleted air. The use of SOEGS cells is beneficial for purposes of energy efficiency and lower system weight. In addition, the replacement of ozone-depleting organic halides such as Halon that are used as fire extinguishing agents on aircraft with an inert gas generation system is more environmentally benign. In one example configuration, ceramic solid oxide fuel cells may be leveraged in a variety of systems (e.g., producing electrical current and generating inerting gas). In some configurations, both fuel and air are fed into the cells, resulting in a voltage difference across the cell that can be used to generate an electric current. In such configurations, the cathode of the fuel cell is positive, while the anode of the fuel cell is negative. Further, in some configurations, solid oxide systems have been used to accomplish electrolysis of water or carbon dioxide, splitting the water or carbon dioxide into separated components. Various example SOEGS systems are disclosed and discussed in U.S. Patent Application Publication Nos. 2017/0167036 A1 and 2018/0140996, the disclosures of which are incorporated herein by reference in their entireties.

As noted above, the systems described herein can be used to generate inert gas, oxygen, and/or power, depending on a mode of operation and the specific configuration of the generator. Supplying such gas or power to locations on an aircraft may require various considerations, such as locations of water, gases, powered electronics, protected spaces (e.g., cargo holds, fuel tank ullages, etc.). At times, specifically for vehicle critical systems, the proximity of the generator may be important to ensure prompt generation of the inert gas, oxygen, and/or power.

Embodiments of the present disclosure are directed to positioning systems in locations to generate gases or power substantially or relatively close to a point of use—rather than the necessarily most convenient location on an aircraft (e.g., due to space, components, etc.). Furthermore, embodiments described herein are directed to providing redundancy of systems (i.e., redundant inert gas, oxygen, and/or power generation systems, as described above).

Vehicle critical systems, as used herein, are systems that are necessary for safe operation of a given vehicle. Such systems can be electrical, mechanical, or generation systems, necessary to ensure safe and continued operation of the vehicle. For example, if the vehicle is an aircraft, "flight critical" ("FC") systems on an aircraft are the most safety-critical systems. If FC systems were to fail, malfunction, or be absent from the aircraft, then an unsafe condition due to an undersized engine shutdown may occur, or a catastrophic failure resulting in serious damage or loss of the aircraft may ensue. As will be appreciated by those of skill in the art, an aircraft cannot depart without the FC systems being operational. Examples of FC systems include, but are not limited to, the following systems: communication, traffic collisions avoidance, emergency power, fire suppression, $O_2$ generation (e.g., for tactical aircraft). Furthermore, in addition to FC systems, an aircraft may have Mission critical ("MC") systems that are important or necessary to meet mission objectives, but are less safety-critical than FC systems. One non-limiting example of an MC system is a fuel tank inerting system. Those of skill in the art will appreciate that other systems may be designated FC or MC, depending on the nature of the system, the specific aircraft, flight requirements, mission requirements, use requirements, etc. Thus, the above described FC and MC systems are not intended to be limited to these specific examples. However, it will be appreciated that certain systems are not FC or MC, such non-critical systems include, but are not limited to, in-flight-entertainment systems, galley equipment, etc.

In accordance with some embodiments of the present disclosure, an electrochemical device with at least two stacks on board is provided. The electrochemical device provides for redundant functionality, with single- or dual-mode envisioned (gas separator and/or fuel cell). The electrochemical device may be a PEM system or a SO system, as discussed above. Electrochemical systems are differentiated by the electrolytes employed in such systems. By definition, electrolytes transport ions but not electrons. Embodiments of the present disclosure are discussed with respect to two different types of electrolytes: (1) a polymeric variety that conducts protons, also known as a proton exchange membrane (PEM), and (2) a ceramic variety that conducts ions, either oxygen ions or protons, which is usually known as solid oxide (SO). It will be appreciated that other systems, mechanisms, and/or configurations may be employed without departing from the scope of the present disclosure.

In accordance with some embodiments of the present disclosure, the redundant electrochemical systems can provide power and/or gas generation in at least two modes of operation: a first mode being electrolytic operation providing power/gas to fuel tank inerting systems, core flight systems, and $O_2$ generation (e.g., for life support), and a second mode being fuel cell operation providing power/gas to fuel tank inerting systems, core flight systems, and emergency power systems (EPS).

Figure 5:
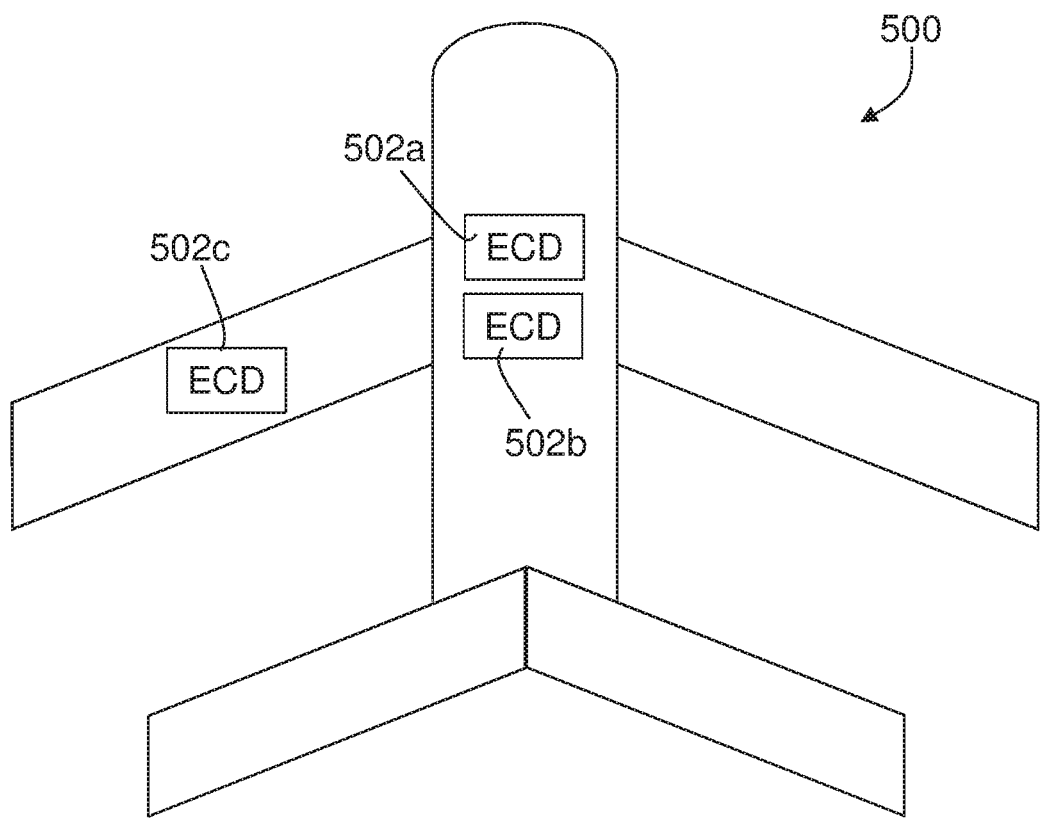
FIG. 5 is a schematic illustration of a vehicle incorporating a redundant system in accordance with an embodiment of the present disclosure.

Turning now to FIG. 5, a schematic illustration of a vehicle 500 (illustrated as an aircraft) having multiple, redundant electrochemical devices 502a-c for electrical power and/or inert gas generation in accordance with an embodiment of the present disclosure is shown. In this illustrative embodiment, a first electrochemical device 502a and a second electrochemical device 502b are each located within a mechanical bay of the vehicle 500 (e.g., as described above). The first and second electrochemical devices 502a, 502b may be configured as redundant systems that are each arranged to supply, at a minimum, FC and/or MC inert gas, oxygen, and/or electrical power generation. That is, each of the first electrochemical device 502a and the second electrochemical device 502b may be arranged to supply 100% of the FC and/or MC needs of an aircraft, if the other of the first electrochemical device 502a or the second electrochemical device 502b fails. However, during normal operation, each of the first and second electrochemical devices 502a-b can be operated at less than full capacity (as the two electrochemical devices can be operated jointly with each at less than full operating potential). Operation at partial load is typically more efficient in both modes of operation. This increased efficiency is due to the characteristics of performance typical of electrochemical systems.

Further, as illustratively shown in FIG. 5, a third electrochemical device 502c is arranged on a wing of the vehicle 500. The third electrochemical device 502c can be an additional redundant electrochemical device, which can also be configured to supply 100% of the FC and/or MC needs of the vehicle 500. That is, the combination of the three redundant electrochemical devices 502a-c can provide the inert gas, oxygen, and/or electrical power needs of the vehicle 500 during normal use, with each redundant electrochemical device 502a-c operating at less than full capacity. However, if one or more of the redundant electrochemical devices 502a-c fails, the remaining redundant electrochemical devices 502a-c can be operated at greater capacity to supply, at a minimum, FC and/or MC needs of the vehicle 500.

It is noted that the third electrochemical device 502c is located within the wing of the vehicle 500. That is, the third electrochemical device 502c is arranged at a location different from the other electrochemical devices 502a-b. By arranging at least one electrochemical device at a different location, in addition to providing safety (e.g., if a failure happens in proximity to another electrochemical device) the location may be optimal for the specific needs of the vehicle 500. For example, one or both of the first and second electrochemical devices 502a-b may be configured to supply inerting gas for a fire suppression system of a cargo hold of the vehicle 500. Further, one or both of the first and second electrochemical devices 502a-b may be configured to supply electrical power to one or more FC and/or MC electrical components. At the same time, the third electrochemical device 502c may be configured to supply inert gas to a fuel tank ullage located in a wing of the vehicle 500 and/or can be configured to supply electrical power to components within the wing of the vehicle 500 (e.g., controllers and/or components of flight control surfaces such as ailerons, flaps, etc.).

As shown in FIG. 5, the first and second electrochemical devices 502a-b are co-located (e.g., same bay or proximal to each other) and the third electrochemical device 502c is distributed (e.g., located away from the other electrochemical devices). As such, as noted above, an electrochemical device of the present disclosure can be located close to a point of use. During normal operation, each of the electrochemical devices 502a-c can be operated at less than full capacity to provide inert gas, oxygen, and/or electrical power in proximity to the specific electrochemical device. However, if one or more of the electrochemical devices fails, the remaining one or more electrochemical devices may be operated at a higher capacity to account for the failure of the other device(s).

Although shown with three electrochemical devices on the vehicle 500, such configuration is not to be limiting. For example, at a minimum, two electrochemical devices may be arranged on an aircraft in a redundant manner, whether co-located or distributed. However, three or more electrochemical devices may be employed in this manner, without departing from the scope of the present disclosure. The electrochemical devices can be different sizes in order to cover various demands throughout a mission. For example, inert gas for fuel tank inerting is highest during descent when the demanded flow rate is larger than inert gas required for cargo-fire suppression low rate of discharge systems (CFS-LRD). In one non-limiting embodiment, an electrochemical system is sized to generate electricity in a first mode of operation (e.g., fuel cell mode for emergency power). In a second mode of operation of the same system, the electrochemical system generates more than enough inert gas to cover fuel tank inerting requirements as well as CFS-LRD.

As noted above, the electrochemical devices can be configured to generate inert gas and/or electrical power, depending on a mode of operation. As noted above, fuel tank inerting is not vehicle-critical, so redundancy is not required for this system. In contrast, fire suppression, emergency electrical power, and $O_2$ generation for life support systems on tactical aircraft are vehicle (e.g., mission) critical. The electrochemical devices provide redundancy for these vehicle critical systems.

Figure 6:
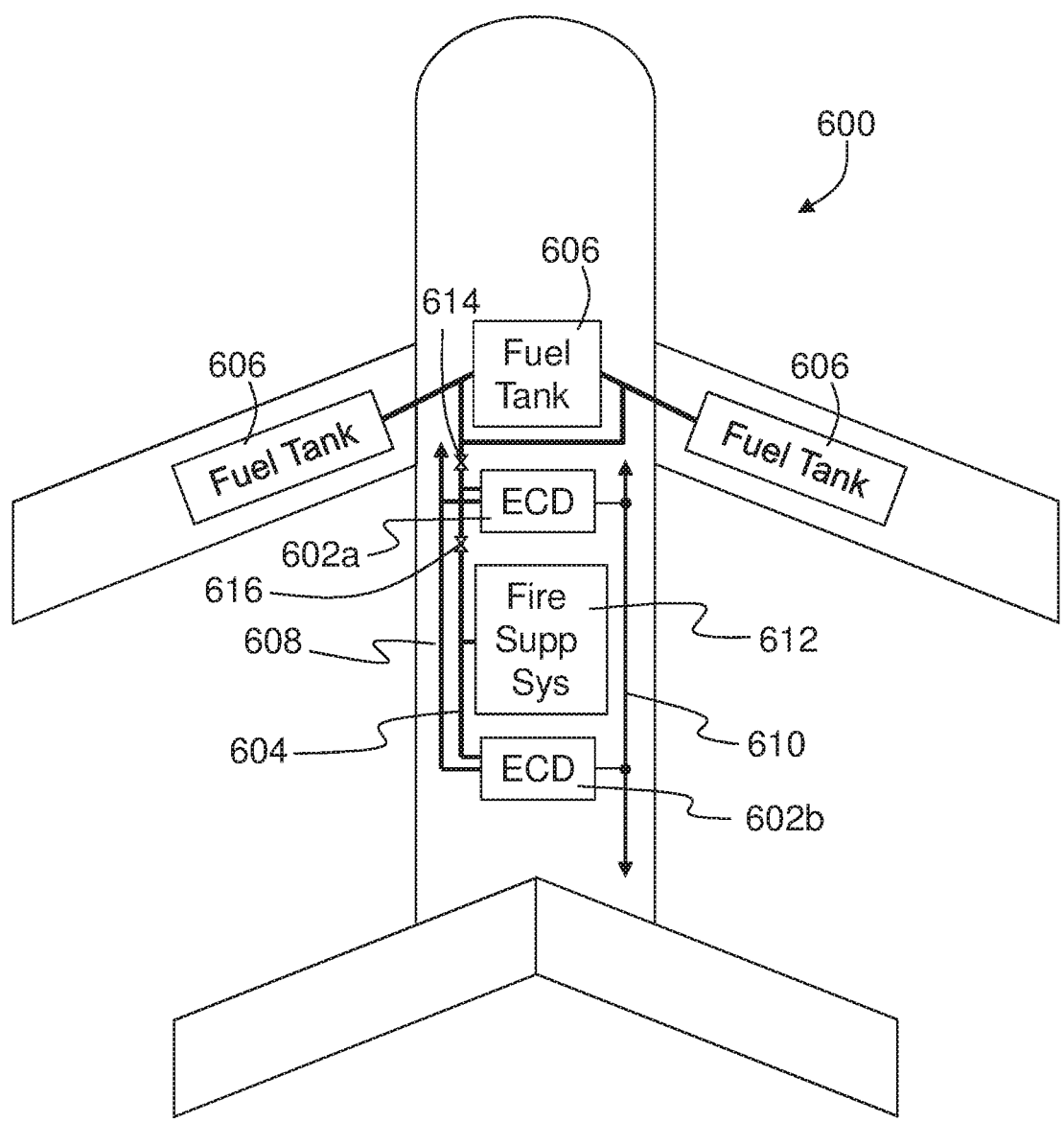
FIG. 6 is a schematic illustration of a vehicle incorporating a redundant system in accordance with an embodiment of the present disclosure.

Turning now to FIG. 6, a schematic illustration of a vehicle 600 (illustrated as an aircraft) having a redundant electrochemical device system in accordance with an embodiment of the present disclosure is shown. In this non-limiting embodiment, a first electrochemical device 602a and a second electrochemical device 602b are arranged to supply inert gas, oxygen, and/or power to various locations on the vehicle 600. The electrochemical devices 602a-b each configured to output inert gas to a common inert gas distribution manifold 604 to supply inert gas to fuel tank ullages of one or more fuel tanks 606. Further, a common $O_2$ distribution manifold 608 is provided to supply oxygen to a life support system (or to another system or location on or off the vehicle 600). Accordingly, in this embodiments, the fuel tank inerting system of the vehicle 600 and the oxygen system of the vehicle 600 each have a redundant electrochemical device system connected thereto, such that failure of one of the electrochemical devices 602a, 602b does not impact the FC or MC systems of the aircraft.

Furthermore, in this illustrative embodiment, the redundant electrochemical device system is configured to output power to an electrical bus 610 (e.g., DC bus). The electrochemical devices 602a, 602b can thus be operated in a gas generation mode to generate inert gas and/or oxygen, or in a power or fuel cell mode to generate electrical power to be supplied on the electrical bus 610 to one or more electrical components. In a fuel cell mode, the electrochemical devices 602a, 602b can be configured to generate inert gas to be supplied to a fuel tank inerting system and/or to a fire suppression system.

In some embodiments, the common inert gas distribution manifold 604 contains one or more valves or other control elements that allow selective routing of inert gas to a fire suppression system 612 (e.g., in a cargo hold) or to a fuel tank inerting system (including fuel tanks 606). In normal operation, for example, a first valve 614 may be normally open, to allow for inert gas to be directed to the fuel tanks 606 and a second valve 616 may be normally closed. However, because fire suppression is a vehicle-critical function, the valves 614, 616 can be reversed if the second electrochemical device 602b fails. That is, the first electrochemical device 602a can be configured to provide inert gas to the fire suppression system 612, if the other (second) electrochemical device 602b fails. However, if the first electrochemical device 602a fails, because fuel tank inerting is not vehicle (mission or flight) critical, the mission can be continued without adjusting the position/state of the valves 614, 616. Furthermore, the common inert gas distribution manifold 604 can include at least one check valve (not shown) to prevent any fuel vapors from entering the common $O_2$ distribution manifold 608. Although not shown, the illustrative system shown in FIG. 6 can include power lines into the electrochemical devices 602a, 602b, supply lines into the electrochemical devices 602a, 602b for reactants (e.g., air, water, hydrogen, oxygen, etc.), etc.

Figure 7:
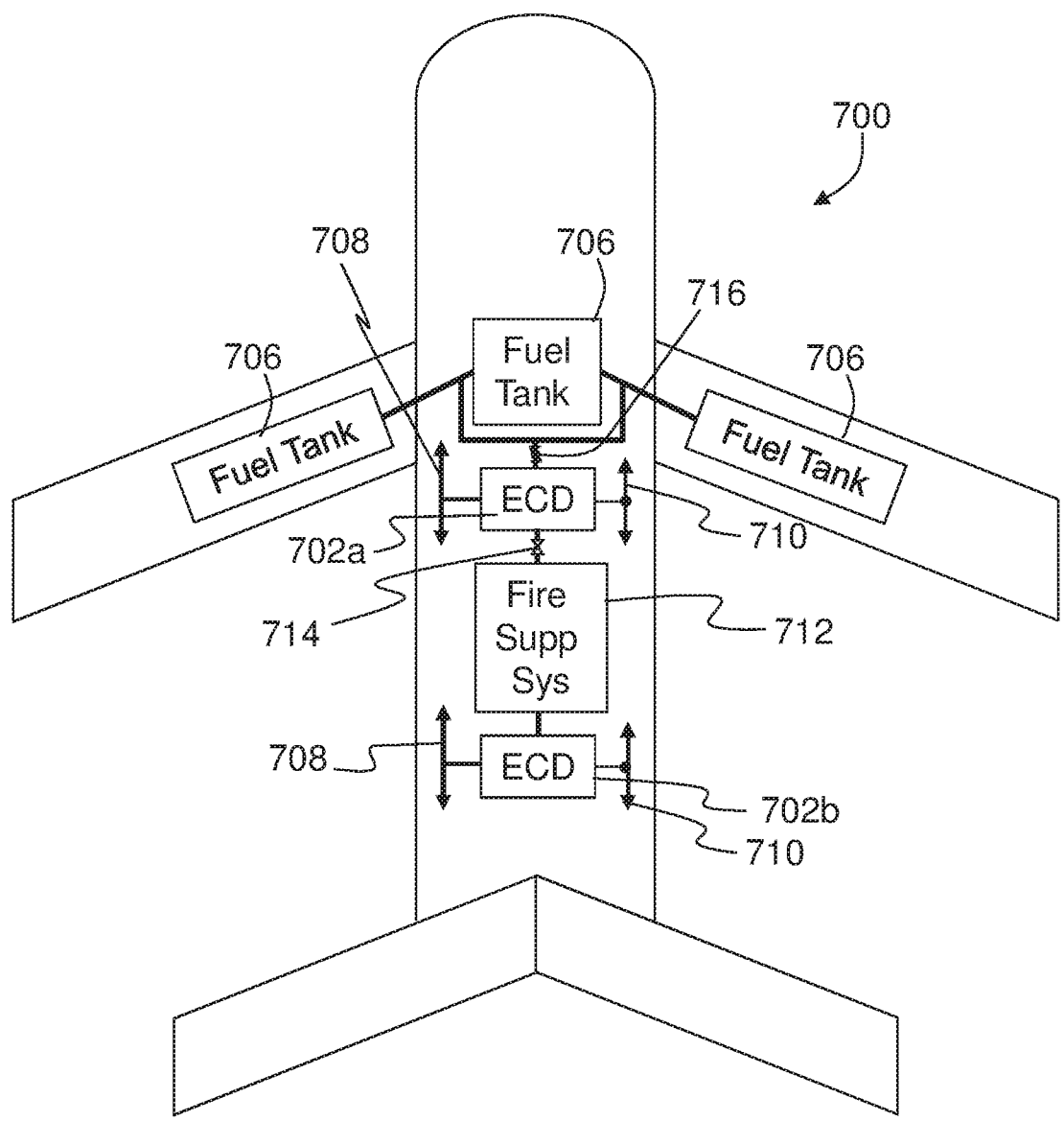
FIG. 7 is a schematic illustration of a vehicle incorporating a redundant system in accordance with an embodiment of the present disclosure

Turning now to FIG. 7, a schematic illustration of a vehicle 700 (illustrated as an aircraft) having a redundant electrochemical device system in accordance with an embodiment of the present disclosure is shown. In this non-limiting embodiment, a first electrochemical device 702a and a second electrochemical device 702b are arranged to supply inert gas, oxygen, and/or power to various locations on the vehicle 700. In this embodiment, a fire suppression system 712 can receive inert gas from either electrochemical device 702a, 702b directly. As shown, a first valve 714 is configured to selectively isolate the first electrochemical device 702a from the fire suppression system 712. The second electrochemical device 702b is connected to the fire suppression system 712.

Each of the electrochemical devices 702a-b may be connected to a common $O_2$ distribution manifold 708 to supply oxygen to a life support system (or to another system or location on or off the vehicle 700). In this embodiment, however, there is no common inerting gas manifold. That is, only the first electrochemical device 702a is configured to provide inert gas to fuel tank ullages to one or more fuel tanks 706 of the vehicle 700. A second valve 716 is arranged to selectively close the fuel tank inerting system from the first electrochemical device 702a, to ensure that inert gas is provided from the first electrochemical device 702a to the fire suppression system 712 in the event of a failure of the second electrochemical device 702b. In some embodiments, both a check valve (i.e., one-way) and a selective operation (e.g., on/off valve) can be implemented. The specific valve/control arrangement is not to be limited to illustrations herein, but rather any type of flow control can be employed without departing from the scope of the present disclosure. It is noted that in some embodiments, the electrochemical devices 702a-b may be connected to separate $O_2$ distribution manifolds, and the present illustration is not to be limiting.

Accordingly, in this embodiment, the oxygen system of the vehicle 700 has a redundant electrochemical device system connected thereto, such that failure of one of the electrochemical devices 702a, 702b does not impact the FC or MC systems of the aircraft. However, as noted, the fuel tank inerting system does not have a redundant electrochemical device because such aspect is not MC or FC. Similar to the embodiment of FIG. 6, in this illustrative embodiment, the redundant electrochemical device system is configured to output power to an electrical bus 710 (e.g., DC bus). The electrochemical devices 702a, 702b can thus be operated in an electrolytic mode to generate inert gas and/or oxygen, or in a power or fuel cell mode to generate electrical power to be supplied on the electrical bus 710 to one or more electrical components. In a fuel cell mode of operation, the electrochemical devices 702a, 702b may be used to generate an inert gas to be supplied to a fuel tank inerting system and/or to a fire suppression system.

In this embodiment, in operation, the first electrochemical device 702a normally generates inert gas for the fuel tanks 706. In some embodiments, the first electrochemical device 702a may have a larger stack than the second electrochemical device 702b because fuel tank inerting may require more inert gas than fire suppression systems depending on a phase of flight of an aircraft. As noted, the first electrochemical device 702a is outfitted with valves that allows selective routing of inert gas to the fire suppression system 712 (e.g. in a cargo hold) and/or to a fuel tank inerting system including the fuel tanks 706. As discussed, fire suppression is a vehicle-critical function, and thus the first suppression system 712 is provided with redundant electrochemical devices.

Although illustratively shown in FIGS. 6-7 with the electrochemical devices located within the central portion of the aircraft, in alternative embodiments, one or more electrochemical devices may be located elsewhere on the aircraft. For example, if one or more electrochemical devices are configured to generally supply inerting gas to fuel tanks, such electrochemical devices may be arranged in or on the wings of the aircraft (e.g., as shown in FIG. 5). Further, in some embodiments, an electrochemical device can be arranged close to the cockpit of an aircraft in order to supply oxygen for life support and/or to generate and supply electrical power to vehicle (e.g., flight) critical electrical components within the cockpit. Thus, the illustrative embodiments are not to be limiting, but rather are provided for illustrative and explanatory purposes.

In the above described embodiments, and in accordance with embodiments of the present disclosure, a multiple, redundant system is provided. In the simplest example, with two electrochemical devices (first and second), each of the first and second electrochemical devices can be operated in one of two modes (although additional modes may be employed depending on the configuration and needs of the vehicle and/or electrochemical devices). In a first mode of operation of each of the electrochemical devices, the respective electrochemical devices operates at less than full capacity and provides inerting gas, oxygen, and/or electrical power. This first mode of operation may be employed during normal operation of the vehicle. However, if, for example, the second electrochemical device fails, the first electrochemical device can be switched into a second mode of operation wherein the first electrochemical device provides inerting gas, oxygen, and/or electrical power to MC and/or FC components, as needed, to compensate for the failure/loss of the second electrochemical device. Given that the systems is designed to be redundant, the second electrochemical device can provide the compensation for a loss of or failure of the first electrochemical device. Similarly, such redundancy may be implemented with any number of redundant electrochemical devices. During the second mode of operation of a given electrochemical device, the operating capacity may be increased to generate additional inerting gas, oxygen, and/or electrical power, as needed. As such, embodiments of the present disclosure can reduce or eliminate instances where vehicle operation (or a mission) may be compromised due to the loss of an electrochemical device.

Advantageously, embodiments of the present disclosure provide for redundant and/or optimally positioned back-up and/or generation systems on vehicles for vehicle critical components/systems (e.g., flight or mission critical for aircraft). For example, advantageously, embodiments provided here can locate or position sources of inert gas, oxygen, and/or power generation close to a point of use. Further, according to some embodiments, backup systems are provided to enable a mission to continue even after one device or system fails, thus extending the flight capabilities of aircraft. Moreover, in some embodiments, if a redundant system is sized to be capable of generating and/or providing full power/inert gas requirements to another system, then operating each redundant system at less than full power (operate at partial capacity) can be more efficient. Furthermore, if one of the redundant systems fails, the remaining systems can be operated at full capacity to account for the loss of one of the other redundant systems.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A redundant electrochemical system for an aircraft, the system comprising:

a first electrochemical device located at a first position on the aircraft wherein the first electrochemical device is configured to generate at least one of inert gas, oxygen, and electrical power for use onboard the aircraft;

a second electrochemical device located at a second position on the aircraft wherein the second electrochemical device is configured to generate the same at least one of inert gas, oxygen, and electrical power as the first electrochemical device for the same use onboard the aircraft as the first electrochemical device; and a backup system including a controller configured to control operation of each of the first electrochemical device and the second electrochemical device;

wherein the first electrochemical device is configured to operate in a first mode during normal operation of the aircraft and a second mode when the second electrochemical device fails, wherein in the second mode, the first electrochemical device provides the at least one of inert gas, oxygen, and electrical power for at least one flight critical system of the aircraft, and wherein the first mode of the first electrochemical device is a less than full capacity mode of operation and wherein the second mode of the first electrochemical device is an operational mode that has a greater capacity than the first mode of operation to compensate for the failure of the second electrochemical device, wherein the backup system is configured to transition the first electrochemical device from the first mode to the second mode when the second electrochemical device fails, to extend flight capabilities of the aircraft.

2. The system of claim 1, wherein the second electrochemical device is configured to operate in a first mode during normal flight and a second mode when the first electrochemical device fails, wherein the first mode of operation of the second electrochemical device is a less than full capacity mode of operation and, wherein when in the second mode of the second electrochemical device, the second electrochemical device provides the at least one of inert gas, oxygen, and electrical power for at least one flight critical system of the aircraft at a capacity greater than the first mode of operation to compensate for the failure of the first electrochemical device;

wherein the backup system is configured to transition the second electrochemical device from the first mode to the second mode when the first electrochemical device fails, to extend flight capabilities of the aircraft.

3. The system of claim 1, further comprising at least one additional electrochemical device, wherein the at least one additional electrochemical device is configured to operate in a first mode during normal flight and a second mode when at least one of the first electrochemical device and the second electrochemical device fails, wherein in the second mode of operation of the at least one additional electrochemical device, the at least one additional electrochemical device provides the same at least one of inert gas, oxygen, and electrical power as the first electrochemical device for the same at least one flight critical system of the aircraft at a capacity to compensate for the failure of the at least one of the first electrochemical device and the second electrochemical device, wherein the backup system is configured to transition the at least one additional electrochemical device from the first mode to the second mode when at least one of the first electrochemical device and the second electrochemical device fails, to extend flight capabilities of the aircraft.

4. The system of claim 1, wherein at least one of the first electrochemical device and the second electrochemical device is inerting system having a PEM that comprises:
an electrochemical cell comprising a cathode and an anode separated by a separator comprising a proton transfer medium;
a cathode fluid flow path in operative fluid communication with a catalyst at the cathode between a cathode fluid flow path inlet and a cathode fluid flow path outlet;
a cathode supply fluid flow path between a cathode supply gas source and the cathode fluid flow path inlet;
an anode fluid flow path in operative fluid communication with a catalyst at the anode, including an anode fluid flow path outlet;
an electrical connection configured to connect the electrochemical cell to a power source or power sink; and
an inerting gas flow path in operative fluid communication with the cathode flow path outlet and the cathode supply gas source.

5. The system of claim 1, wherein the first location and the second location are in substantially the same area onboard the aircraft.

6. The system of claim 5, wherein the first location is within or proximate a cargo hold of the aircraft.

7. The system of claim 1, wherein the first location and the second location are in different areas onboard the aircraft.

8. The system of claim 7, wherein the first location is within or proximate a cargo hold of the aircraft and the second location is within or on a wing of the aircraft.

9. The system of claim 1, wherein the at least one flight critical system comprises a fuel tank inerting system, a fire suppression system, a life support system, and/or an emergency electrical power system.

10. The system of claim 1, wherein, when the first electrochemical device is configured to generate at least inert gas, the first and the second electrochemical devices are each fluidly connected to a common inert gas distribution manifold to supply inert gas to fuel tank ullages of one or more fuel tanks of the aircraft.

11. The system of claim 10, further comprising a valve located within the common inert gas distribution manifold to control a fluid connection between the first electrochemical device and a fire suppression system, wherein the valve is closed in the first mode and open in the second mode.

12. The system of claim 1, wherein, when the first electrochemical device is configured to generate at least $O_2$, the first and the second electrochemical devices are each fluidly connected to a common $O_2$ distribution manifold to supply oxygen to a life support system of the aircraft.

13. The system of claim 1, wherein, when the first electrochemical device is configured to generate at least electrical power, the first and the second electrochemical devices are each electrically connected to an electrical bus to supply electrical power to one or more electrical components of the aircraft.

14. The system of claim 1, wherein, when the first electrochemical device is configured to generate at least inert gas, each of the first and second electrochemical devices is fluidly connected to a fire suppression system of the aircraft, the system further comprising:
a valve arranged to control the fluid connection between the first electrochemical device and the fire suppression system, wherein the valve is closed in the first mode and open in the second mode.

15. The system of claim 1, wherein at least one of the first electrochemical device and the second electrochemical device comprises a solid oxide (SO) electrochemical gas separator.

16. A method of generating at least one of inerting gas, oxygen, and electrical power on an aircraft, wherein a first electrochemical device is located at a first position on the aircraft wherein the first electrochemical device is configured to generate at least one of inert gas, oxygen, and electrical power and a second electrochemical is device located at a second position on the aircraft wherein the second electrochemical device is configured to generate the same at least one of inert gas, oxygen, and electrical power as the first electrochemical device, the method comprising:
operating the first electrochemical device in a first mode to generate the at least one of inert gas, oxygen, and electrical power, wherein the first mode of the first electrochemical device is a less than full capacity mode of operation;
operating the second electrochemical device in a first mode to generate the same at least one of inert gas, oxygen, and electrical power as the first electrochemical device, wherein the first mode of the second electrochemical device is a less than full capacity mode of operation; and
operating the first electrochemical device in a second mode, when the second electrochemical device fails, wherein in the second mode, the first electrochemical device generates the at least one of inert gas, oxygen, and electrical power for at least one flight critical system of the aircraft, wherein the second mode of operation of the first electrochemical device is an operational mode that has a greater capacity than the first mode of operation to compensate for the failure of the second electrochemical device.

17. The method of claim 16, wherein the at least one flight critical system comprises a fuel tank inerting system, a fire suppression system, a life support system, and/or an emergency electrical power system.

18. The method of claim 16, wherein the first electrochemical device comprises one of a proton exchange membrane and a solid oxide electrolyte electrochemical device.

19. The method of claim 16, further comprising operating the second electrochemical device in a second mode of operation that is at a capacity greater than the first mode of operation of the second electrochemical device to compensate for a failure of the first electrochemical device.

20. The method of claim 16, further comprising operating at least one additional electrochemical device in a first mode during normal flight and a second mode when at least one of the first electrochemical device and the second electrochemical device fails, wherein in the second mode of operation of the at least one additional electrochemical device, the at least one additional electrochemical device provides the same at least one of inert gas, oxygen, and electrical power as the first electrochemical device for the same at least one flight critical system of the aircraft at a capacity to compensate for the failure of the at least one of the first electrochemical device and the second electrochemical device.

* * * * *